United States Patent
Saito et al.

(10) Patent No.: US 8,177,301 B2
(45) Date of Patent: May 15, 2012

(54) ARMREST

(75) Inventors: Makoto Saito, Ina (JP); Takashi Morimoto, Ina (JP); Yoshiharu Kitamura, Aikawa-machi (JP)

(73) Assignee: NHK Spring Co., Ltd., Yokohama-Shi, Kanagawa (JP)

( * ) Notice: Subject to any disclaimer, the term of this patent is extended or adjusted under 35 U.S.C. 154(b) by 445 days.

(21) Appl. No.: 12/373,320

(22) PCT Filed: Jul. 10, 2007

(86) PCT No.: PCT/JP2007/063760
§ 371 (c)(1), (2), (4) Date: Jun. 10, 2009

(87) PCT Pub. No.: WO2008/007678
PCT Pub. Date: Jan. 17, 2008

(65) Prior Publication Data
US 2009/0309407 A1 Dec. 17, 2009

(30) Foreign Application Priority Data
Jul. 13, 2006 (JP) .................................. 2006-193240

(51) Int. Cl.
*A47C 7/54* (2006.01)
*B60N 2/46* (2006.01)
(52) U.S. Cl. ............................. 297/411.32; 297/411.38
(58) Field of Classification Search ............. 297/411.32, 297/411.38; 192/41 S, 43, 223.3, 223.4
See application file for complete search history.

(56) References Cited

U.S. PATENT DOCUMENTS

| | | | | |
|---|---|---|---|---|
| 3,800,922 A * | 4/1974 | Kreissler | ................ | 188/134 |
| 5,170,871 A * | 12/1992 | Batchelder | ................ | 192/41 S |
| 5,482,221 A * | 1/1996 | Peterson et al. | ................ | 242/285 |
| 6,050,645 A * | 4/2000 | Bradbury | ................ | 297/411.38 |
| 6,209,960 B1 * | 4/2001 | Bradbury | ................ | 297/411.35 |
| 6,916,068 B2 * | 7/2005 | Kitamura et al. | ................ | 297/411.3 |
| 7,198,331 B2 * | 4/2007 | Omori | ................ | 297/411.32 |
| 7,393,058 B2 * | 7/2008 | Omori | ................ | 297/411.32 |
| 7,484,810 B2 * | 2/2009 | Yamane et al. | ................ | 297/411.32 |

FOREIGN PATENT DOCUMENTS

JP 2004-147791 A 10/2003
JP 2003299547 A 10/2003

OTHER PUBLICATIONS

CD-ROM of the Specification and Drawings Annexed to the Request of Japanese Utility Model Application No. 62200/1991 (Laid-Open No. 8027/1993), (Sony Corp.) Feb. 2, 1993.

* cited by examiner

*Primary Examiner* — Peter R. Brown
(74) *Attorney, Agent, or Firm* — Lowe Hauptman Ham & Berner, LLP (57) ABSTRACT

An armrest, has a stationary shaft rotatably supporting an armrest body against a seat frame. The stationary shaft is inserted, so as to have fastening tolerance, inside a coil lock spring and to have a stationary-side hook and a free-side hook. A diameter of the coil lock spring is reduced or enlarged according to a normal or a reverse rotation, respectively, of the armrest body, so as to prevent or permit, respectively, the rotation of the armrest body. One of the inside diameter of the lock spring and the outside diameter of the stationary shaft is tapered in said shaft's axial direction.

4 Claims, 10 Drawing Sheets

(a) Locked condition (diameter-reduced condition)

(b) Unlocked condition (diameter-enlarged condition)

(c) Relocked condition (diameter-reduced condition)

ARMREST

CROSS-REFERENCE TO RELATED APPLICATIONS

The present Application is based on International Application No. PCT/JP2007/063760, filed on Jul. 10, 2007, which in turn corresponds to Japanese Application No. 2006-193240 filed on Jul. 13, 2006, and priority is hereby claimed under 35 USC § 119 based on these applications. Each of these applications are hereby incorporated by reference in their entirety into the present application.

TECHNICAL FIELD

The present invention relates to an armrest that is mounted to a seat of a vehicle, and in particular, to a movable armrest whose angle can be adjusted in a non-step manner.

BACKGROUND ART

Patent Documents 1 and 2 disclose conventional, movable armrests. Each of these armrests has a structure such that the armrest body can rotate against a seat frame, and such that a coil spring is used as a lock spring for locking or unlocking the rotation of the armrest body.

The armrest disclosed in Patent Document 1 has a two-shaft structure wherein a stationary shaft and a movable shaft are coaxially assembled together, with a lock spring wound around said shaft structure. The stationary shaft is fixed to a seat frame and, while the stationary shaft is being fixed to the seat frame, the stationary shaft serves as a shaft portion that fixes the lock spring. The movable shaft is fixed to the armrest body so as to rotate together with the armrest body, and the lock spring is wound in such a way that the lock spring extends from the stationary shaft so as to reach the movable shaft. When the diameter of the lock spring is reduced, the rotation of the armrest body is locked via the movable shaft, and when the diameter of the lock spring is increased, the movable shaft and the armrest body can rotate.

In the armrest of Patent Document 1, the angle of the armrest body is adjusted in a non-step manner by such a two-shaft structure. In order for this two-shaft structure to have sufficient strength to support the armrest (i.e., strength to support the weight of a human arm placed on the armrest), it is necessary for the lock spring to be wound a certain number of turns around the stationary shaft in addition to being wound a certain number of turns around the movable shaft. Because of the large number of times that the lock spring must be wound around the movable shaft and the stationary shaft, the height of the lock spring becomes high, and the thickness of the entire armrest becomes large. Due to such constraints on the height of the lock spring due because it must be wound a sufficient number of turns, there are limitations in making the armrest thinner.

The armrest disclosed in Patent Document 2 uses only a stationary shaft that supports the rotation of the armrest body. The armrest disclosed in Patent Document 2 has a one-shaft structure wherein the lock spring is wound around the stationary shaft so that the rotation of the armrest body is locked or unlocked. While the stationary-side hook of the lock spring is fixed to the armrest body, the free-side hook of the lock spring moves in the lock spring's diameter-enlarging direction or its diameter-reducing direction. When the free-side hook moves in the diameter-reducing direction, locking by the lock spring is effected, and when the free-side hook moves in the diameter-enlarging direction, locking by the lock spring is undone. In this one-shaft structure, it is not necessary for the stationary shaft to be coaxially assembled with a movable shaft, and therefore the lock spring does not need to be wound around a movable shaft. Thus, the height of the lock spring can be short, and the armrest can be thin.

[Patent Document 1] Japanese Published Patent Application No. 2004-147791

[Patent Document 2] Japanese Published Patent Application No. 2003-299547

SUMMARY OF THE INVENTION

However, the one-shaft structure armrest disclosed in Patent Document 2, has problems such that, while the lock spring shifts from its rotatable condition (i.e., unlocked or inactive condition, when the diameter of the lock spring is increased and there is a space between the lock spring and the stationary shaft) to its locked condition (when the diameter of the lock spring is reduced and the lock spring is fastened to the stationary shaft), the lock spring is bent until the lock spring is in its locked condition.

For the armrest to be used comfortably, it is preferable that the lock spring instantaneously shift from its unlocked or inactive condition to its locked condition. However, in the armrest of Patent Document 2, the shift of the lock spring does not occur instantaneously, and the lock spring is bent in its rotation direction until the lock spring is locked—i.e., until the lock spring has been wound and fastened around the stationary shaft. When a human arm is placed on the armrest under the unlocked or inactive condition of the lock spring and under the condition that such bending has occurred, the armrest undergoes an unstable operation wherein—due to the weight of the human arm—the armrest body goes down in the rotating direction in an amount equal to the amount of bending.

The reasons for such an unstable operation are that
(1) (as will be described later with reference to FIG. 17), when the free-side hook of the lock spring returns from its unlocked condition (where the free-side hook is pressed so as to enlarge the diameter of the lock spring) to its locked condition, the diameter of the lock spring is—due to mutual friction between its coils—sequentially reduced, starting from the side of its free-side hook, and such diameter-reducing action stops when the coil on the side of the free-side hook contacts the stationary shaft; and
(2) the diameter of the coil of the lock spring on the side of the stationary hook is not reduced completely, leaving a space between the coil and the stationary shaft.

When such a space is present, the armrest is in an unstable condition. However, when a load is applied on the armrest in the locking direction by a human arm being placed thereon, the armrest body goes down in the rotating direction in an amount equal to the space, so that the space is eliminated. Thus, the armrest avoids the above-mentioned unstable condition.

Also, in the armrest of Patent Document 2, a free-action part is formed on the unlocking plate member that unlocks the lock spring. This free-action part presses the free-side hook of the lock spring in the unlocking direction so as to unlock the lock spring. However, the position of the free-side hook of the lock spring is very unstable vertically, which makes it difficult to perform stable unlocking. In other words, there is the problem that, due to the vertical displacement of the position of the free-side hook of the lock spring, the free-side hook is easily disengaged from the free-action part.

Furthermore, when, after unlocking, the armrest body is rotated in its storage direction, the plate member escapes from the free-side hook of the lock spring. In light of the forced rotation of the armrest body in the armrest-storing direction, the plate member must have a movement groove whose movement range is larger than the actual movement range of the armrest body. That is to say, the free-action part, which presses the free-side hook of the lock spring, inevitably becomes long and is therefore prone to deformation, fracture, and the like (see paragraphs 0013 to 0018 and FIG. 4 of Patent Document 2).

The present invention has been made to overcome the above-mentioned problems. The objective of the present invention is to provide an armrest that has a single-shaft structure wherein—when the free-side hook of the lock spring of the armrest is returned from its unlocked condition (wherein the free-side hook has been pressed to increase the lock spring's diameter) to its locked condition—the diameter of the lock spring is reduced sequentially in the entire coil part from the free-side stationary-side hook-side coil to the stationary-side hook-side coil of the lock spring. Thanks to this structure, bending of the lock spring, which lasts until the lock spring reaches its locked condition, is reduced. Therefore, the angle is adjusted in a smooth, stepless manner, and the free-side hook of the lock spring does not become disengaged at the time of unlocking, which results in prevention of deformation and breakage, as well as comfortable use of the armrest.

To achieve the above-mentioned objective, the invention is an armrest wherein a stationary shaft that rotatably supports an armrest body against a seat frame, is inserted—so as to have fastening tolerance—inside a lock spring that is a coil spring having a stationary-side hook and a free-side hook. The diameter of the lock spring is reduced or enlarged according to the normal or reverse rotation, respectively, of the armrest body, so as to lock or unlock, respectively, the rotation of the armrest body. Either the inside diameter of the lock spring and/or the outside diameter of the stationary shaft is/are tapered along the shaft's axial direction.

The invention is an armrest that includes a stationary shaft fixed to a seat frame, an armrest body into which the stationary shaft is inserted and that is rotatably supported by the stationary shaft, and a lock spring whose one end is a stationary-side hook locked to the armrest body, whose other end is a free-side hook, and in which the stationary shaft is inserted so as to have fastening tolerance. A canceling block that is rotatably arranged near the free-side hook of the armrest body. A cam member has an unlocking cam part that, by contacting the free-side hook via the canceling block when the armrest body is rotated in the armrest-storing direction, enlarges the diameter of the lock spring so as to unlock the armrest body. A relocking cam part is spaced from the unlocking cam part in the rotating direction of the armrest body and that, by contacting the free-side hook via the canceling block when the armrest body is rotated in the armrest-use direction, reduces the diameter of the lock spring so as to lock the armrest body, the armrest is either the inside diameter of the lock spring and/or the outside diameter of the stationary shaft is/are tapered along said shaft's axial direction.

In another aspect of the invention, the inside diameter of the lock spring is tapered in such a way that, under a free condition, the inside diameter on the free-side hook side is larger than the inside diameter on the stationary-side hook side.

In another aspect of the invention, the outside diameter of the stationary shaft is tapered in such a way that the outside diameter of the lock spring on the free-side hook side is smaller than the outside diameter of the lock spring on the stationary-side hook side.

In yet another aspect of the invention, the stationary-side hook of the lock spring is drawn out of one end of the lock spring's coil part. Such drawn-out portion is bent out from the coil part in the direction crossing the axial direction of the coil part. A hook-fixing member, into which the approximately entire length of the stationary-side hook is inserted and locked, is fixed to the armrest body.

In another aspect of the invention, either the inside diameter of the lock spring for locking and unlocking the stationary shaft and/or the outside diameter of the stationary shaft is/are tapered along the axial direction of the stationary shaft, and therefore the inside diameter of the lock spring can be smoothly reduced or enlarged so as to lock or unlock, respectively, the lock spring. Accordingly, bending of the lock spring—which continues until the lock spring reaches the locked condition—is small. Thus, usability is good, and it is possible to adjust the angle of the armrest in a stepless manner.

In a still further aspect of the invention, even if an operating force in the unlocking direction is applied to the armrest when the armrest is in the armrest-storage position, the canceling block and the lock spring rotate under the condition that the free-side hook of the lock spring is in contact with the canceling block. Thus, excess force is not applied to the lock spring, the cam member, and the like, and therefore deformation and damage of the lock mechanism are prevented. Furthermore, the free-side hook of the lock spring contacts the canceling block, and therefore the free-side hook does not become dislocated at the time of unlocking, and hence the operation proceeds stably.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF EXPLANATIONS OF THE DRAWINGS

The present invention is illustrated by way of example, and not by limitation, in the figures of the accompanying drawings, wherein elements having the same reference numeral designations represent like elements throughout and wherein:

FIGS. 9(a) to 9(F) are side views of a seat and armrest in one embodiment of the present invention, showing the entire range of sequential angle-adjustments of the armrest.

FIGS. 10(a) to 10(c) are cross-sectional views showing the action of the lock spring.

FIGS. 17(a) to 17(c) are cross-sectional views showing the action of the lock spring used in a conventional armrest.

EXPLANATIONS OF NUMBERS USED IN THE DRAWINGS 1 armrest mounting part
2 stationary shaft
2b large-diameter part of the stationary shaft
2c small-diameter part of the stationary shaft
4 armrest body
5 lock spring
5a stationary-side hook
5b free-side hook
5c coil part
6 hook-fixing member
6a lock groove
7 cam member
7b unlocking cam part
7c relocking cam part
8 canceling block
10 pivot
12 spring pin

BEST MODES FOR CARRYING OUT THE INVENTION

The present invention will now be explained more specifically, referring to the illustrations of the embodiments. In each embodiment, corresponding members have the same numbers.

Figure 1:
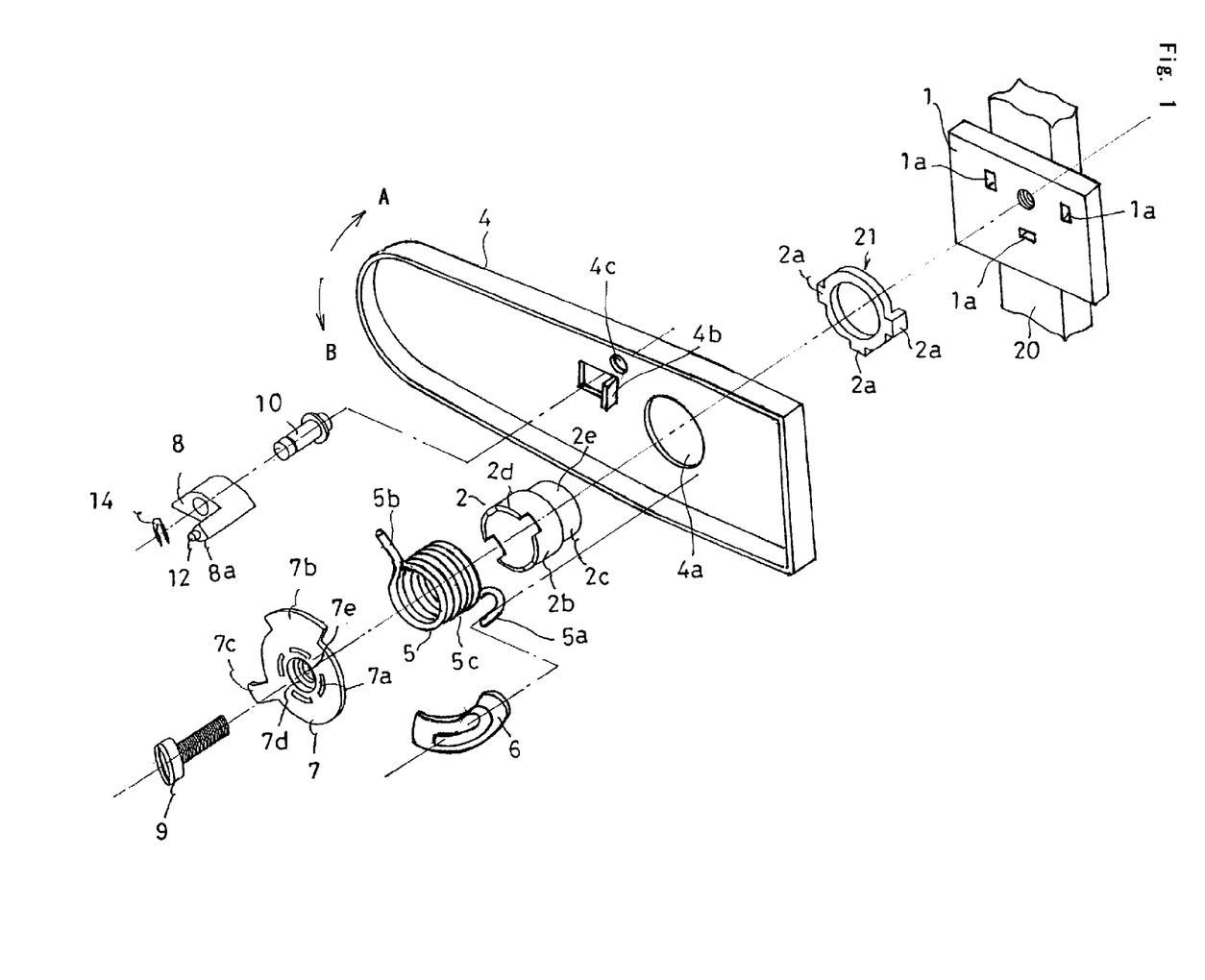
FIG. 1 is an exploded perspective view of the entire armrest in one embodiment of the present invention.
Figure 2:
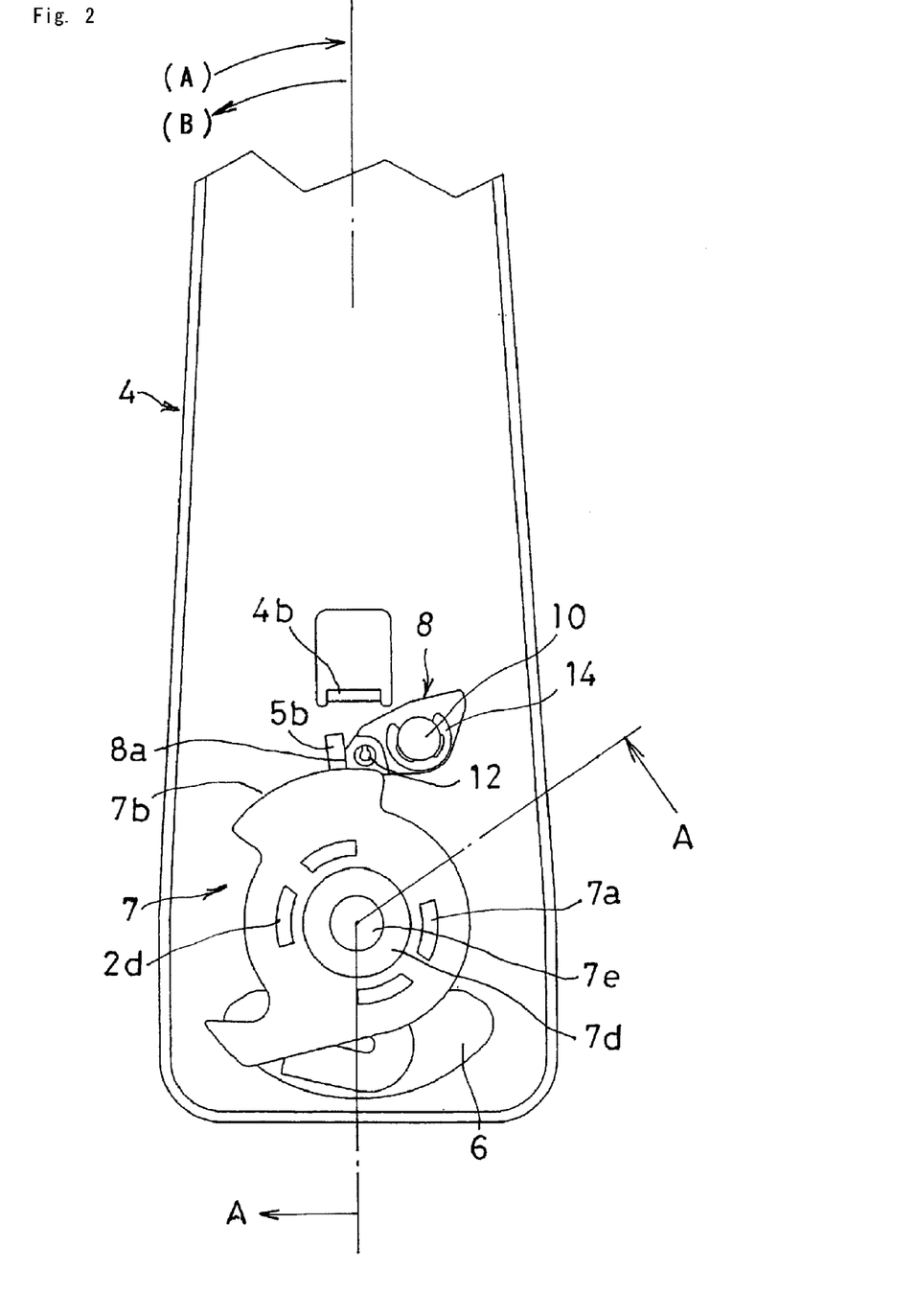
FIG. 2 is a front view showing said embodiment in an assembled condition when the armrest is in the armrest-storage position.
Figure 3:
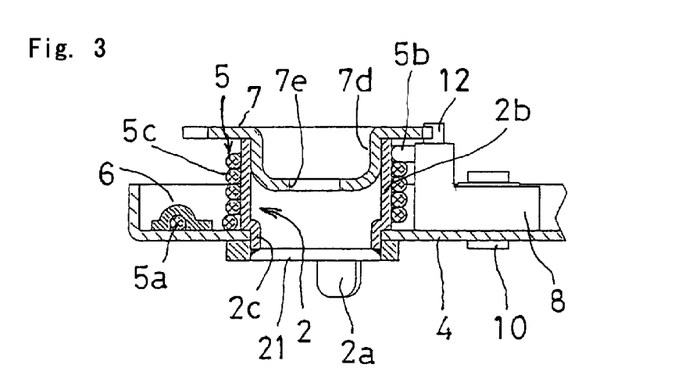
FIG. 3 is a cross-sectional view taken along the line A-A of FIG. 2.
Figure 4:
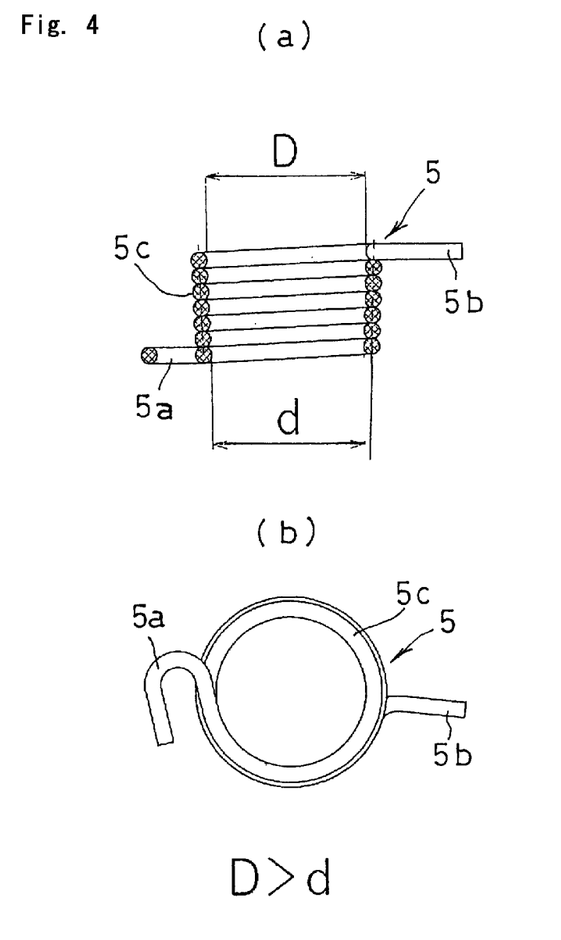
FIG. 4(a) is a cross-sectional view of a lock spring.
FIG. 4(b) is a plane view thereof.
Figure 5:
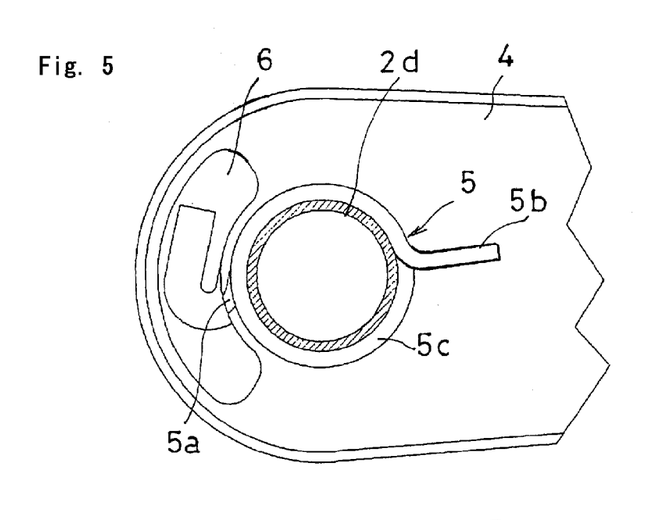
FIG. 5 is a front view of the portion of the armrest where a hook-fixing member is arranged.
Figure 6:
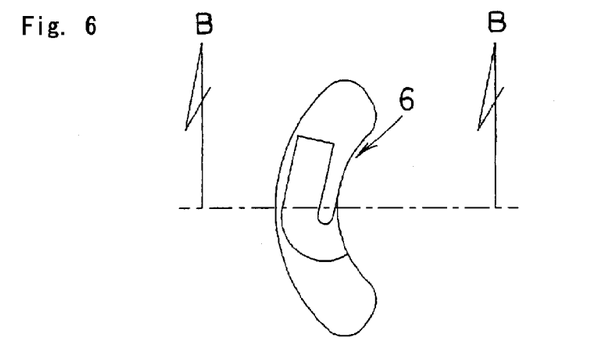
FIG. 6 is a plane view of the hook-fixing member.
Figure 7:
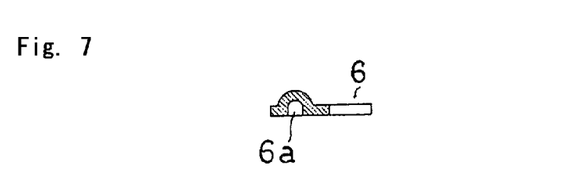
FIG. 7 is a cross-sectional view taken along the line B-B of FIG. 6.
Figure 8:
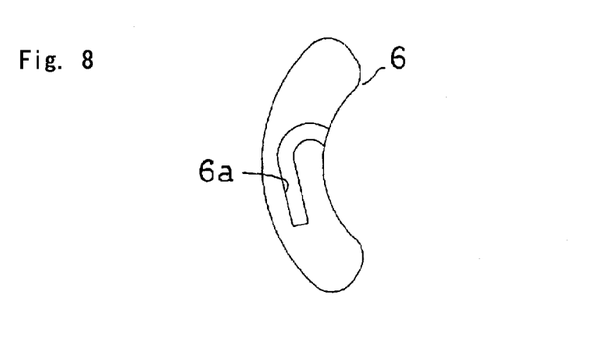
FIG. 8 is a bottom view of the hook-fixing member.
Figure 9:
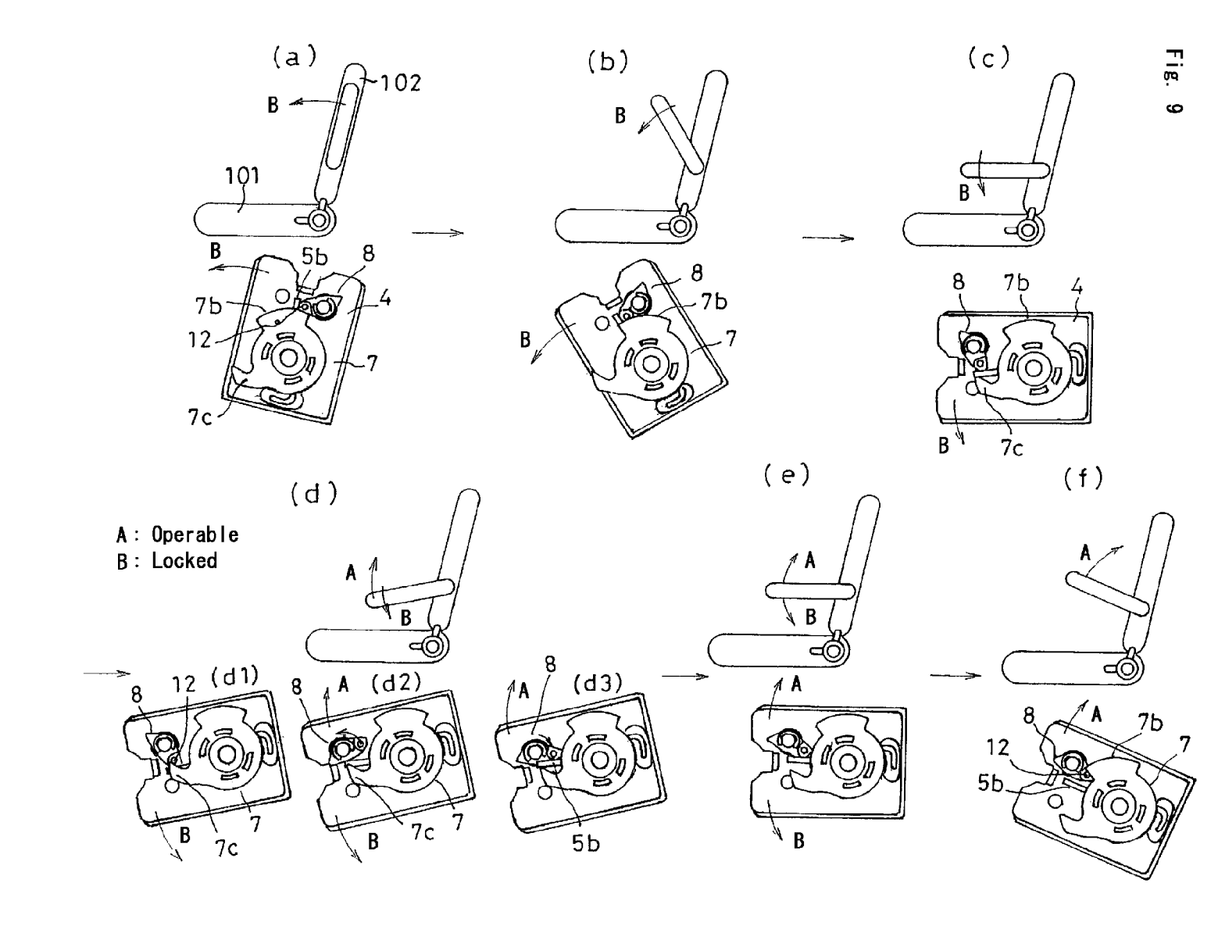
Figure 10:
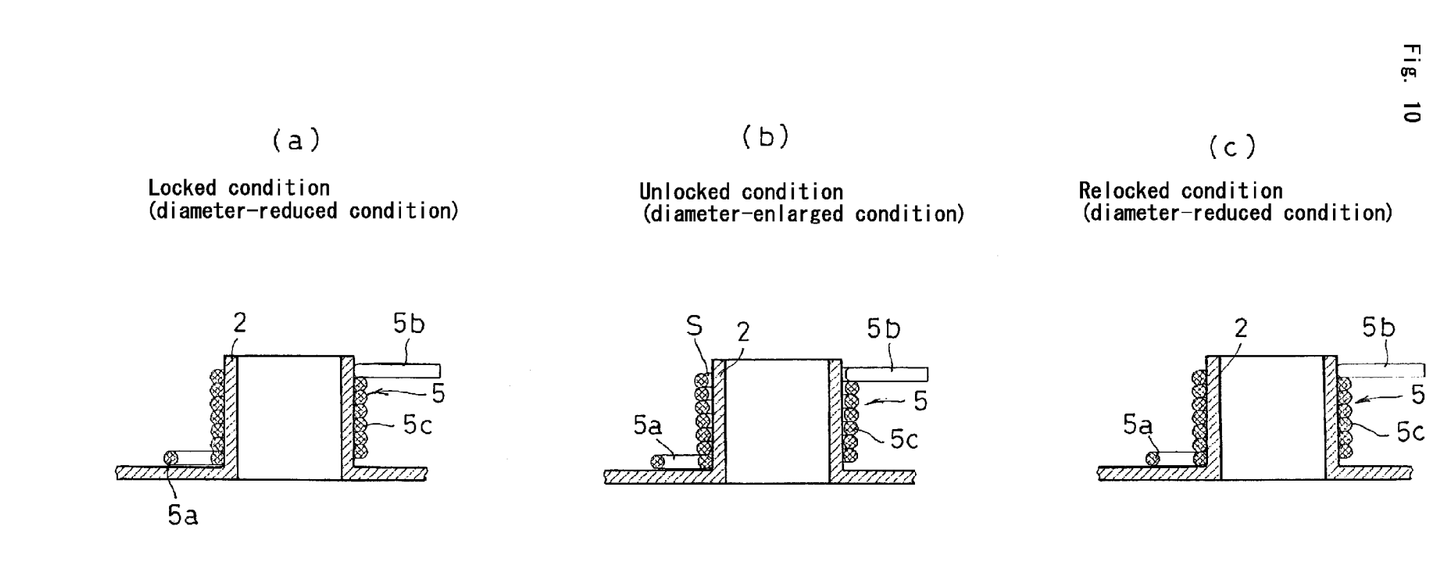

FIGS. 1 to 10 show one embodiment of the present invention. FIG. 1 is an exploded perspective view of an armrest. FIG. 2 is a front view under an assembled condition when the armrest is in the armrest-storage position. FIG. 3 is a cross-sectional view taken along the line A-A of FIG. 2. FIG. 4 shows a cross-sectional view and a front view of a lock spring. FIG. 5 is a front view of the portion of the armrest where a hook-fixing member is arranged. FIG. 6 is a plane view of the hook-fixing member. FIG. 7 is a cross-sectional view taken along the line B-B of FIG. 6. FIG. 8 is a bottom view of the hook-fixing member. FIG. 9 consists of side views of a seat and armrest, showing the entire range of sequential angle-adjustments of the armrest. FIG. 10 consists of cross-sectional views showing the action of the lock spring. As shown in FIGS. 1 to 3, the armrest in this embodiment includes an armrest body 4, a stationary shaft 2, a lock spring 5, a cam member 7, and a canceling block 8. The entire armrest is mounted to an armrest mounting part 1, which is fixed to a seat frame 20 by welding or the like.

As shown in FIGS. 1 and 2, the stationary shaft 2 has a stepped shape that includes a large-diameter part 2b and a small-diameter part 2c, and a ring element 21 that is fixed—by welding or the like—to the armrest mounting part 1 side of the small-diameter part 2c. This ring element 21 is integrated with the stationary shaft 2 by welding or the like. While the ring element 21 and a stepped part 2e (which is between the small-diameter part 2b and the small-diameter part 2c of the stationary shaft 2) are nipping the armrest body 4, the ring element 21 is fixed to the armrest mounting part 1 side of the small-diameter part 2c of the stationary shaft 2. As a result, the stationary shaft 2 supports the armrest body 4 in a rotatable manner in both the normal and reverse directions. Also, the circumference of the ring element 21 includes three pawl parts 2a that project out from the side of the armrest mounting part 1, and these pawl parts 2a are fitted with fitting holes 1a at opposing positions of the armrest mounting part 1, so that the entire stationary shaft 2 is unmovably mounted to the armrest mounting part 1.

Thus, this armrest has a one-shaft structure wherein the rotation of the armrest body 4 is supported by the stationary shaft 2. In FIG. 1, the arrow A indicates the direction for moving the armrest into its storing place, and the arrow B indicates the direction for moving the armrest out of its storing place. These directions are the directions for holding or locking the armrest in actual use.

The armrest body 4 extends from the stationary shaft 2 toward the seat cushion (see FIG. 9), and its base end includes an insertion hole 4 through which the small-diameter part 2c of the stationary shaft 2 is inserted. The small-diameter part 2c is inserted into this insertion hole 4a, so that the rotation of the armrest body 4 is supported.

As shown in FIG. 4, the lock spring 5 has a coil part 5c that is wound around the large-diameter part 2b of the stationary shaft 2, and that has a stationary-side hook 5a and a free-side hook 5b that respectively extend out radially from the opposite two ends of the coil part 5c. This lock spring 5 is wound—in a manner so as to have fastening tolerance—around the outer circumference of the large-diameter part 2b of the stationary shaft 2. In this case, the inside diameter of the coil part 5c is slightly smaller than the outside diameter of the large-diameter part 2b of the stationary shaft 2. Thus, under a free condition, the coil part 5c closely contacts the outer circumference of the large-diameter part 2b of the stationary shaft 2. Accordingly, while the diameter of the lock spring 5 is enlarged to some extent, the stationary shaft 2 is inserted into the coil part 5c. Thereafter, by canceling the diameter-enlarged condition, the coil part 5c can be wound around the large-diameter part 2b of the stationary shaft 2 while they closely contact each other. The lock spring 5 is wound in such a way that the diameter of the coil part 5c is enlarged at the time of unlocking when the armrest is stored out of use, and so that the diameter of the coil part 5c is reduced at the time of locking when the armrest is in an armrest-lowered position (which is the armrest-actual-use angle position).

The free-side hook 5b of the lock spring 5 extends outward radially from the coil part 5c in a linear manner, and is in a free condition. In this free condition, the free-side hook 5b contacts the canceling block 8 and the cam member 7 (which will be described later), so as to enlarge or reduce the diameter of the lock spring 5.

The stationary-side hook 5a of the lock spring 5 is fixed to the armrest body 4. The stationary-side hook 5a is drawn out from the coil part 5c on the opposite side to the free-side hook 5b. The portion drawn out from the coil part 5c is bent near the coil part 5c in the direction orthogonal to the axial direction of the coil part 5c, so that the stationary-side hook 5a is formed. In this embodiment, the portion drawn out from the coil part 5c is bent in an approximate U-shape so as to form the stationary-side hook 5a. To fix the armrest body 4 to the stationary-side hook 5a, a hook-fixing member 6 is installed, as shown in FIG. 1.

The hook-fixing member 6 is formed into a shape that is entirely curved like an arc, and it is fixed to the armrest body 4 by welding or the like. A lock groove 6a that has a shape (an approximate U-shape) that corresponds to the shape of the stationary-side hook 5a of the lock spring 5 is formed in the hook-fixing member 6 (see FIG. 8). Approximately the entire length of the stationary-side hook 5a is inserted into the lock groove 6a, so that the stationary-side hook 5a is locked with the hook-fixing member 6. By this locking, the lock spring 5 rotates when the armrest body 4 is rotated. Also, because approximately the entire length of the stationary-side hook 5a is inserted into the hook-fixing member 6 and is locked therein, the load—such as the weight of a human arm—that is applied on the armrest, and that is to be supported by the armrest, is received and borne by approximately the entire length of the stationary-side hook 5a. Accordingly, even if the load (weight of a human arm) acts on the stationary-side hook 5a, the stationary-side hook 5a does not become deformed or broken, and stable operation of the armrest is secured.

In the present invention, the fastening tolerance of the lock spring 5 against the outer circumference of the large-diameter part 2b of the stationary shaft 2 is not uniform. That is, the fastening tolerance on the stationary-side hook 5a side is set smaller than the fastening tolerance on the free-side hook 5b side. In this embodiment, as shown in FIG. 4, the inside diameter of the coil part 5c is tapered so that the inside diameter D of the free-side hook 5b is larger than the inside diameter d of the stationary-side hook 5a of the coil part 5c of the lock spring 5 (i.e., D>d). As will be explained below with reference to FIG. 10, because of the tapered inside diameter of the coil part 5c, the lock spring 5 can smoothly shift to an enlarged-diameter condition or to a reduced-diameter condition. Therefore, bending of the lock spring 5, which continues until the spring has shifted to its locked condition, is reduced, resulting in improved usability. In this embodiment, although the inside diameter of the coil part 5c of the lock spring 5 varies, the diameter of the stationary shaft 2 is uniform.

The canceling block 8 is arranged near the free-side hook 5b of the lock spring 5. The canceling block 8 is rotatably supported by the pivot 10 (which is fixed to the armrest body 4 so as to be approximately parallel to the stationary shaft 2), and is prevented from becoming detached by an E-ring 14. The pivot 10 is fixed in the hole 4c of the armrest body 4 by clamping and the like. The canceling block 8 contacts a cutout part 4b provided on the armrest body 4, and thereby the range of the rotation angle of canceling block 8 is restricted.

A cam member 7 is mounted to the stationary shaft 2. A projection part 2d is formed at the end of the large-diameter part 2b of the stationary shaft 2, and an arc-like long hole 7a in the cam member 7 is fitted with the projection 2d and then fixed there by clamping and the like, so that the cam member 7 is mounted to the stationary shaft 2. A fan-like unlocking cam part 7b and a relocking cam part 7c—which are to perform unlocking and relocking of the lock spring 5 via the canceling block 8—are provided on the outer circumference of the cam member 7.

By changing the relative angle between the ring element 21 of the stationary shaft 2 and the cam member 7 (i.e., by changing the mounting-position relative angle of the ring element 21 to the stationary shaft 2), the operating position of the armrest can be set as desired. Also, by changing the length of the fan-like shape (i.e., angle) of the unlocking cam part 7b of the cam member 7, and by simultaneously changing the spacing angle between the unlocking cam part 7b and the relocking cam part 7c, the operating range of the armrest can be set as desired.

As shown in FIGS. 1 and 3, a tubular part 7d (which is to be fitted inside the end of the stationary shaft 2) is formed in the central portion of the cam member 7, and a screw hole 7e (into which a screw 9, for integrally fixing the cam member 7 and the stationary shaft 2 to the armrest mounting part 1, is to be inserted) also are provided.

A spring pin 12 is press-fitted at the end on the side of the free-side hook 5b of the lock spring 5 of the canceling block 8. How this spring pin 12 functions while the armrest is being used—while the armrest is in a lowered, approximately horizontal position—is as follows. When the armrest body 4 is rotated in the armrest-storing direction (clockwise [direction A] of FIG. 9(e), for example), the spring pin 12 contacts the unlocking cam part 7b of the cam member 7. When the armrest body 4 is further rotated clockwise, i.e. the armrest-storing direction (direction A), the diameter of the lock spring 5 is enlarged so that the armrest body 4 changes into an unlocked condition. Furthermore, a flat part 8a—which is formed on the bottom face of the end of the canceling block 8—functions to maintain the unlocked condition (i.e., to support the free-side hook 5b of the lock spring 5 in the unlocked condition).

In contrast, when the armrest body 4 is rotated in the armrest-lowering direction, i.e., the counterclockwise direction (direction B), the spring pin 12 contacts the relocking cam part 7c. When the armrest body 4 is further rotated in the armrest-lowering direction, the counterclockwise direction (direction B), the diameter of the lock spring 5 is reduced so that the armrest body 4 changes into a locked (or relocked) condition.

The angle-adjusting operation of the armrest in this embodiment will now be explained below with reference to FIGS. 9(a) to 9(f).

First, the armrest-storage position (i.e., position when the armrest is stored out of use) shown in FIG. 9(a), where the armrest body 4 mounted on the seat frame of a seat 102 has been rotated to an uppermost position, will be explained. The spring pin 12 is being pressed upward by the unlocking cam part 7b, and the flat part 8a of the canceling block 8—which is for supporting the free-side hook 5b of the lock spring 5 in an unlocked condition—is set in an unlocked condition, where the lock spring 5 has been twisted in the rewinding direction so as to reduce the diameter of the lock spring 5. (FIG. 2 also shows a condition of the armrest-storage position.)

In the position of FIG. 9(b), where the armrest body 4 has been rotated counterclockwise (direction B), which is the armrest-lowering direction, the spring pin 12 is still being pressed upward by the unlocking cam part 7b. The flat part 8a of the canceling block 8—which is for supporting the free-side hook 5b of the lock spring 5 in the unlocked condition—maintains the unlocked condition, wherein the lock spring 5 has been twisted in the rewinding direction and its diameter has been enlarged.

In the position of FIG. 9(c), where the armrest body 4 is further rotated counterclockwise (direction B), which is the armrest-lowering direction, the spring pin 12 is apart from the unlocking cam part 7b. However, the flat part 8a of the canceling block 8 still maintains the unlocked condition, wherein the lock spring 5 has been twisted in the rewinding direction and its diameter has been enlarged.

In the position of FIG. 9(d1), the armrest body 4 is further rotated counterclockwise (direction B), which is the armrest-lowering direction, and the spring pin 12 contacts the relocking cam part 7c. Immediately after the position of FIG. 9(d1), the spring pin 12 is pressed by the relocking cam part 7c, and the canceling block 8 reversely rotates counterclockwise. However, the rotation range of the canceling block 8 is restricted by the cutout part 4b of the armrest body 4 (FIG. 9(d2)). Thus, the diameter of the lock spring 5 is reduced, and the lock spring 5 is fastened on the stationary shaft 2. Therefore, the rotation of the armrest body 4 in the armrest-lowering direction (direction B) is locked (or relocked).

After the armrest body 4 has been locked (or relocked) as described above, the armrest body 4 can be adjusted to the angle desired. That is, from the position of FIG. 9(d3), the armrest body can rotate clockwise (direction A), which is the armrest-storing direction, but it cannot rotate counterclockwise (direction B), because the rotation is locked. FIG. 9(e) shows the lowered position of the armrest body 4 when the armrest is able to be used.

As shown in FIG. 9(f), when the armrest body 4 is further rotated clockwise (direction A), which is the armrest-storing direction, the spring pin 12 is pressed by the end of the unlocking cam part 7b and is rotated clockwise. Thus, the spring pin 12 is pressed upward by the unlocking cam part 7b, and the flat part 8a of the canceling block 8 presses the free-side hook 5b of the lock spring 5 in the rewinding direction so as to enlarge the diameter of the lock spring 5. This results in an unlocked condition, and the unlocked condition is maintained. That is, the armrest body changes into the unlocked condition like that of the abovementioned armrest-storage position shown in FIG. 9(a).

In this embodiment, when the abovementioned actions take place, the spring pin 12 only slides on the unlocking cam part 7b while maintaining the unlocked condition where the free-side hook 5b of the locking spring 5 is in contact with canceling block 8, even when the armrest body 4 is further rotated forcedly clockwise (direction A) from the armrest-storage position. For this reason, excessive force will not act on the lock spring 5, the cam member 7, and the like. Therefore, these locking mechanisms do not suffer from a defect such as deformation.

Figure 16:
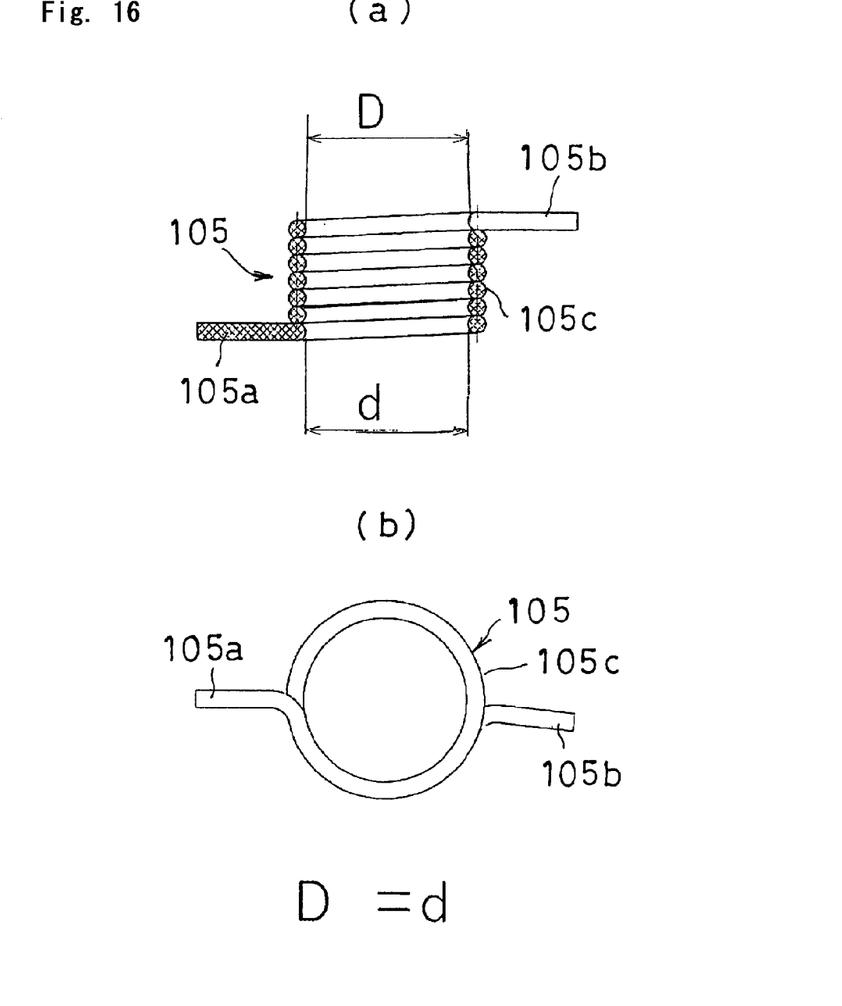
FIGS. 16(a) and 16(b) are a cross-sectional view and a plane view of the lock spring used in a conventional armrest.
Figure 17:
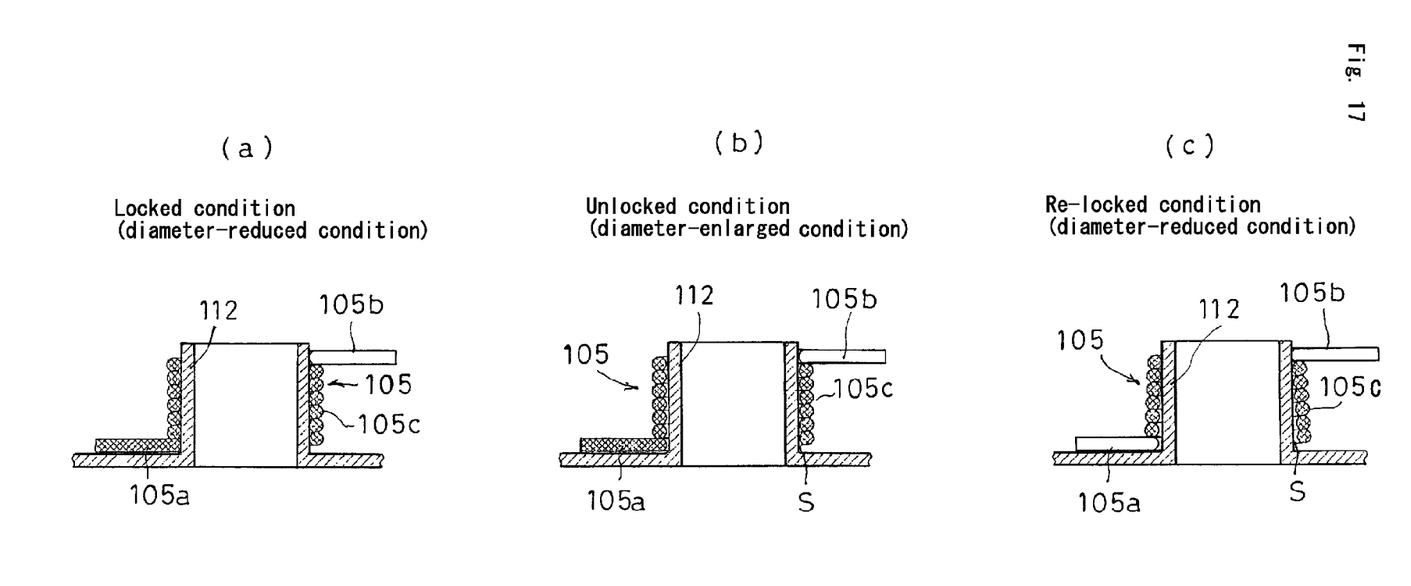

FIG. 10 shows operations of the lock spring 5 under the abovementioned locked condition, unlocked condition, and relocked condition. Also, and FIG. 16 shows the lock spring 105 of Patent Document 2, and FIG. 17 shows the lock spring 105 of Patent Document 2 in those the three respective conditions mentioned above. In FIGS. 16 and 17, 105a denotes the stationary-side hook, 105b denotes the free-side hook, and 105c denotes the coil part of the lock spring 105.

In the lock spring 105 of Patent Document 2, as shown in FIG. 16, the inside diameter D of the coil part 105c on the free-side hook 105b side is identical to the inside diameter d of the coil part 105c on the stationary-side hook 105a side (D=d). How the armrest—which has been assembled by inserting the stationary shaft 112 into the coil part 105c of this lock spring 105—operates is as follows. Under the locked condition, as shown in FIG. 17(a), the diameter-reduced coil part 105c closely contacts the outer circumference of he stationary shaft 112. Under the unlocked condition, as shown in FIG. 17(b), the diameter of the lock spring 105 is enlarged, and the coil part 5c has an approximately uniform spacing S along the entire length of the stationary shaft 112.

When the lock spring 105 shifts from this unlocked condition to a relocked condition, wherein the diameter of the lock spring 105 is reduced (see FIG. 9(d3)), the diameter of the coil part 105c is reduced sequentially from the side of the free-side hook 105b, and the coil part 105c on the free-side hook 105b side contacts the stationary shaft 112. Due to this contact, reduction of the diameter of the coil part 105c stops, which leads to an unstable condition where there is a spacing S between the coil part 105c (on the stationary-side hook 105a side) and the stationary shaft 112. Accordingly, in the case of FIG. 17, when a human arm is placed on the armrest and a load is applied in the locking direction, the armrest body goes down in the rotational direction as much as the spacing S, resulting in poor usability of the armrest.

In this embodiment of the present invention, as shown in FIG. 4, the inside diameter D of the coil part 5c on the free-side hook 5b side is set larger than the inside diameter d of the coil part 5c on the stationary-side hook 5a side. That is, the fastening tolerance of the lock spring 5 against the outer circumference of the large-diameter part 2b of the stationary shaft 2 is not uniform; i.e., the fastening tolerance on the stationary-side hook 5a side of the lock spring 5 is set smaller than that on the free-side hook 5b side. Thus, when the condition of the lock spring 5 is changed from the locked condition (FIG. 10(a)), wherein the diameter of the lock spring 5 is reduced, to the unlocked condition (FIG. 10(b)), wherein the diameter of the lock spring 5 is enlarged, the spacing 5 between the coil part 5c and the stationary shaft 2 on the free-side hook 5b side is naturally larger than that on the stationary-side hook 5a side. Accordingly, when the lock spring 5 shifts to the relocked condition shown in FIG. 10(c), the reduction of the diameter of the lock spring 5—starting from the free-side hook 5b side—does not stop, and the diameter of the entire coil part 5c is reduced smoothly. In this manner, the lock spring 5 smoothly shifts from diameter enlargement to diameter reduction. Therefore, the bending of the lock spring 5, which lasts until the lock spring 5 is in a locked condition, is small. Thus, even when a human arm is placed on the armrest, the armrest body 4 does not move down. As such, the armrest of the present invention is stable and comfortable to use.

Figure 18:
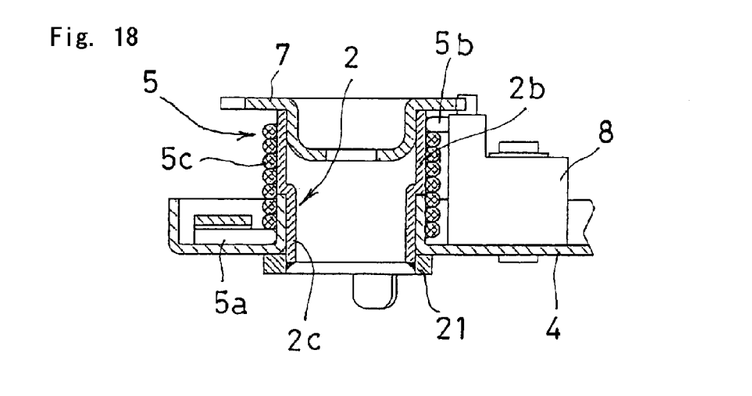
FIG. 18 is a cross-sectional view showing the main parts of a conventional armrest that has a two-shaft structure.

FIG. 18 shows a conventional armrest, disclosed in Patent Document 1 and the like, having a two-shaft structure. That armrest's members that correspond to those in this embodiment of the present invention have same numbers as those in this embodiment. In FIG. 18, 130 denotes a movable shaft that is formed integrally with an armrest body 4. The small-diameter part 2c of the stationary shaft 2 is inserted in the movable shaft 130, which forms an outer circumference in such a way that the movable shaft 130 is flush with the large-diameter part 2b of the stationary shaft 2. The lock spring 150 is made of a coil part and is wound around the movable shaft 130 and the outer circumference of the large-diameter part 2b of the stationary shaft 2, thereby securing strength to support the armrest. Accordingly, the lock spring 150 needs to be wound both around the movable shaft 130 and the large-diameter part 2b of the stationary shaft 2. In other words, winding by the lock spring 150 requires that the lock spring 150 be a certain length. For this reason, the height of the lock spring 150 inevitably becomes large. Therefore, the thickness of the entire armrest becomes large, and the armrest cannot be made thin.

Meanwhile, in this embodiment of the present invention, only a stationary shaft 2 is used, and a movable shaft 150 is not used. Therefore, the lock spring 5 needs to be wound only around the stationary shaft 2 (see FIG. 3). Accordingly, the height of the lock spring 5 can be made small, which can reduce the thickness of the entire armrest, resulting in a thin armrest.

Further, in this embodiment's above-mentioned angle adjustments, unintended occurrences, such as vibration and noise, can take place when the canceling block 8 rapidly contacts, or rapidly moves away from, the unlocking cam part 7b and the relocking cam part 7c via the spring pin 12. To prevent this, it is preferable that a torsion spring be provided between the pivot 10 and the canceling block 8, so that the canceling block 8 is always pressed in a specified direction (for example, in the direction toward the free-side hook 5b of the lock spring 5). Or, in order to buffer the movement of the canceling block 8, it is desirable that the canceling block 8 be arranged between springs such as wave springs, or that high-viscosity grease be applied on the canceling block 8 to give frictional resistance.

Figure 11:
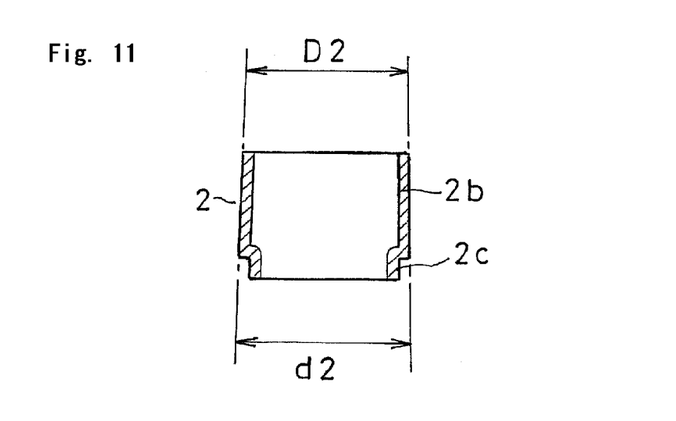
FIG. 11 is a cross-sectional view of another form of the stationary shaft used in the present invention.

In the above-mentioned embodiment, the inside diameter of the coil part 5c of the lock spring 5 is tapered. However, in the present invention, it is also possible that the outside diameter of the large-diameter part 2b of the stationary shaft 2, which is inserted into the lock spring 5, is tapered. FIG. 11 shows such a stationary shaft 2, in which the outside diameter D2 on the free-side hook 5b side of the large-diameter part 2b is smaller than the outside diameter d2 on the stationary-side hook 5a side (D2<d2), and the outside diameter between them varies in a tapered manner. By setting the outside diameter of the large-diameter part 2b of the stationary shaft 2 in this way, the fastening tolerance on the stationary-side hook 5a side of the lock spring 5 becomes larger than that on the free-side hook 5b side. Therefore, the lock spring 5 can smoothly shift from diameter enlargement to diameter reduction, resulting in improved usability of the armrest.

In addition, in the present invention, both the inside diameter of the lock spring 5 and the outside diameter of the stationary shaft 2 can be tapered in the above-mentioned manner, so as to change the fastening tolerance of the lock spring 5.

FIGS. 12 to 15 show other embodiments of the present invention, wherein the armrest body 4 is rotatably nipped by the stationary shaft 2 and the ring element 21.

Figure 12:
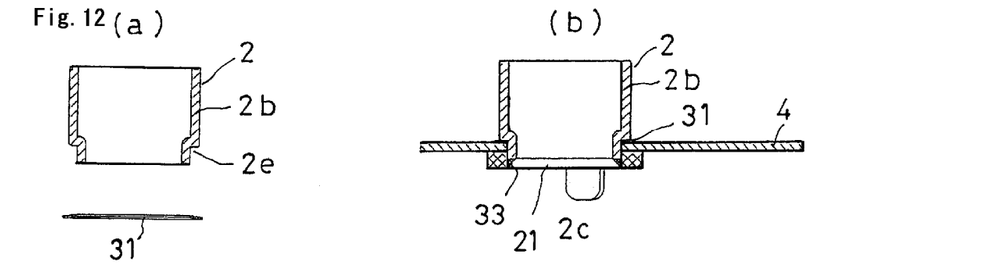
FIGS. 12(a) and 12(b) are cross-sectional views showing a second embodiment's method of nipping the armrest body.

In the embodiment of FIG. 12, a friction plate 31, such as a leaf spring or a wave spring, is used. The friction plate 31 is nipped by the armrest body 4 and the stepped part 2e that is between the large-diameter part 2b and the small-diameter part 2c of the stationary shaft 2. When the friction plate 31 is nipped, the ring element 21 contacts the surface of the armrest body 4, which is on the side of the stationary shaft 2 opposite to the large-diameter part 2b. The small-diameter part 2c of the stationary shaft 2 and the ring element 21 are welded together and fixed so that the armrest body 4 is rotatably supported. Reference number 33 denotes the welded area. In this manner, by nipping the friction plate 31, appropriate friction resistance by the friction plate 31 can be obtained, resulting in improved operability of the armrest.

Figure 13:
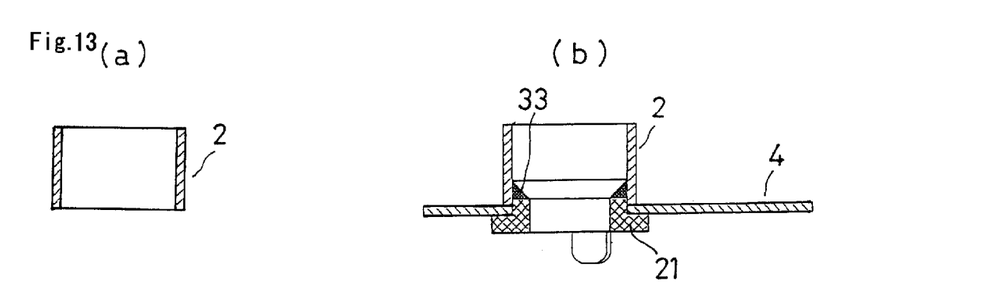
FIGS. 13(a) and 13(b) are cross-sectional views showing a third embodiment's method of nipping the armrest body.

In the embodiment of FIG. 13, the ring element 21 has a stepped shape such that the radius to the periphery of one portion of the ring element 21 is smaller than that of another portion, and the armrest body 4 is rotatably nipped between the stepped part of the ring element 21 and the stationary shaft 2. Under this condition, the ring element 21 and the stationary shaft 2 are fixed to each other at the welded area 33. In this case, as shown in FIG. 13(a), a stationary shaft 2 whose diameter is uniform along its entire length can be used.

Figure 14:
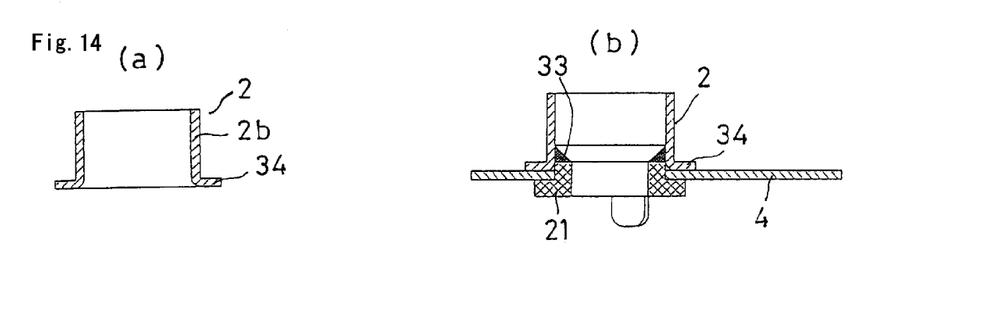
FIGS. 14(a) and 14(b) are cross-sectional views showing a fourth embodiment's method of nipping the armrest body.

In the embodiment of FIG. 14, the ring element 21 of the embodiment of FIG. 13 is used. In addition, as shown in FIG. 14(a), the stationary shaft 2 has a flange part 34 that extends outward. Further, the armrest body 4 is rotatably nipped by the stepped part of the ring element 21 and the flange part 34 of the stationary shaft 2, and then the ring element 21 and the stationary shaft 2 are integrated together at the welded area 33. In this embodiment, the strength for supporting the armrest body 4 can be made large due to the flange part 34 of the stationary shaft 2. As a result, the armrest body 4 does not wobble in the axial direction of the stationary shaft 2, and therefore the lateral play of the armrest body 4 can be reduced.

Figure 15:
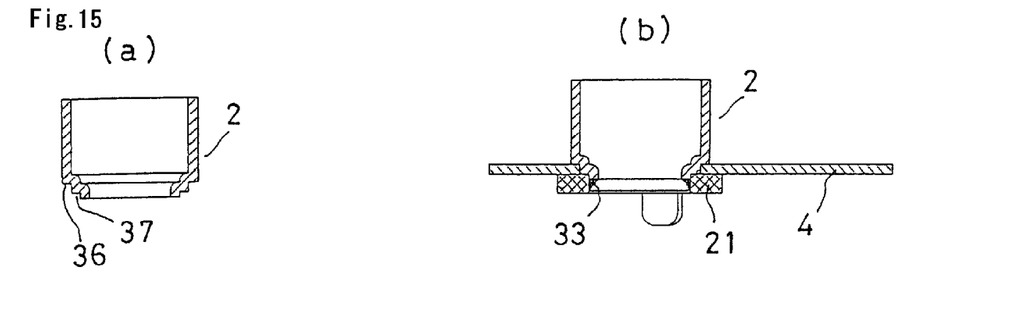
FIGS. 15(a) and 15(b) are cross-sectional views showing a fifth embodiment's method of nipping the armrest body.

In the embodiment of FIG. 15, as shown in FIG. 15(a), two stepped parts 36 and 37 are formed on the stationary shaft 2. The armrest body 4 is mounted to the stepped part 36, and the ring element 21 is brought into contact with the other stepped part 37. Under this condition, the stationary shaft 2 and the ring element 21 are integrated together at the welded area 33. In such a structure for supporting the armrest body 4, as is similar to the embodiment of FIG. 14, the strength for supporting the armrest body 4 is increased, and therefore, the lateral play of the armrest body 4 can be reduced. In addition, because the armrest body 4 is nipped by the ring element 21 and the two stepped parts 36 and 37 of the stationary shaft 2, improved accuracy in nipping the armrest body 4 is obtained.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

What is claimed is:

1. An armrest comprising:
    a stationary shaft adapted to be fixed to an external surface of a seat frame:
    an armrest body into which the stationary shaft is inserted so as to be rotatably supported by said stationary shaft, the armrest body being rotatable in a rotating direction of the armrest body between an armrest-storage position on the seat frame and an armrest-lowered position to which the armrest body is rotated from the seat frame;
    a lock spring including (a) a coil part that contacts the stationary shaft under a free condition; (b) a stationary-side hook that is locked to the armrest body and radially extends out from one end of the coil part; and (c) a free-side hook that radially extends out from the other end of the coil part;
    a pivot that is located adjacent to the free-side hook;
    a canceling block that is rotatably supported by the pivot; and
    a cam member that has:
        (a) an unlocking cam part that, by contacting the free-side hook via the canceling block when the armrest body is rotated in an armrest-storing direction, enlarges a diameter of the lock spring so as to unlock the armrest body, and
        (b) a relocking cam part that is spaced from the unlocking cam part in the rotating direction of the armrest body and that, by contacting the free-side hook via the canceling block when the armrest body is rotated in an armrest-use direction, reduces the diameter of the lock spring so as to lock the armrest body, wherein
    an end of the canceling block corresponding to the free-side hook is in contact with the unlocking cam part when the armrest body is rotated in the armrest-storing direction from the armrest-lowered position, the diameter of the lock spring is enlarged so that the armrest body is moved into an unlocked condition when the armrest body is further rotated in the armrest-storing direction, and the end has a flat part on the bottom of the end to maintain the unlocked condition by supporting the free-side hook in the unlocked condition, and when the armrest body is rotated in the armrest-use direction, the end of the canceling block is in contact with the relocking cam part, and when the armrest body is further rotated in the armrest-use direction, the diameter of the lock spring is reduced so that the armrest body moved into a locked or relocked condition, and at least one of an inside diameter of the lock spring and an outside diameter of the stationary shaft is tapered in an axial direction of the shaft so that a spacing between an inner surface of the coil part and an outer surface of the stationary shaft is larger on the free-side hook side than on the stationary-side hook side when the diameter of the lock spring is enlarged to the unlocked condition, and when the lock spring shifts to the relocked condition, the reduction of the diameter beginning on the free-side hook side does not stop, and the diameter of the entire coil part is reduced.

2. The armrest as described in claim 1, wherein, under the free condition, the inside diameter of said lock spring on the free-side hook side is larger than the inside diameter of said lock spring on the stationary-side hook side.

3. The armrest as described in claim 1, wherein the outside diameter of said stationary shaft on the free-side hook side is smaller than the outside diameter of the stationary shaft on the stationary-side hook side.

4. The armrest as described in claim 1, wherein:
the stationary-side hook of said lock spring is drawn out of one end of the lock spring's coil part,
the drawn-out portion is bent out from the coil part in a direction crossing the axial direction of the coil part, and
a hook-fixing member, into which an approximately entire length of the stationary-side hook is inserted and locked, is fixed to said armrest body.

* * * * *